H. M. SCHEIBE.
STARTING DEVICE FOR ELECTRIC MOTORS.
APPLICATION FILED SEPT. 9, 1907.

934,466.

Patented Sept. 21, 1909.
2 SHEETS—SHEET 1.

WITNESSES
C. L. Belcher
Birney Hines

INVENTOR
Harold M. Scheibe
BY
Wesley G. Carr
ATTORNEY

H. M. SCHEIBE.
STARTING DEVICE FOR ELECTRIC MOTORS.
APPLICATION FILED SEPT. 9, 1907.

934,466.

Patented Sept. 21, 1909.
2 SHEETS—SHEET 2.

WITNESSES:

INVENTOR
Harold M. Scheibe
BY
ATTORNEY

UNITED STATES PATENT OFFICE.

HAROLD M. SCHEIBE, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

STARTING DEVICE FOR ELECTRIC MOTORS.

934,466.  Specification of Letters Patent.  Patented Sept. 21, 1909.

Application filed September 9, 1907. Serial No. 392,051.

*To all whom it may concern:*

Be it known that I, HAROLD M. SCHEIBE, a citizen of the United States, and a resident of Wilkinsburg, in the county of Allegheny and State of Pennsylvania, have invented a new and useful Improvement in Starting Devices for Electric Motors, of which the following is a specification.

My invention relates to electric motors, and particularly to single-phase induction and similar motors in which auxiliary windings, or other auxiliary means, are employed to effect starting.

The object of my invention is to provide exceptionally simple and effective means for interrupting the circuit of the starting winding of an induction motor, or for otherwise rendering the starting means ineffective, when the motor attains a predetermined speed.

Single-phase induction motors are usually provided with auxiliary high-resistance starting windings, the circuits of which are interrupted when the motors attain predetermined speeds, the means heretofore employed for this purpose being operated by centrifugal force. The said means have, consequently, been complicated and expensive in construction, more or less unreliable in operation, and difficult to adjust, and have embodied switch members carried and actuated by the rotatable member of the motor for governing the circuits of the auxiliary windings.

The present device is actuated when the cross magnetizing flux produced in the primary core of the motor by the reaction of the secondary member attains a predetermined value, and is so constructed that the circuit of the auxiliary winding is governed by parts comprising a single movable member, the operation of which is mechanically independent of the rotatable member of the motor.

Figure 1:
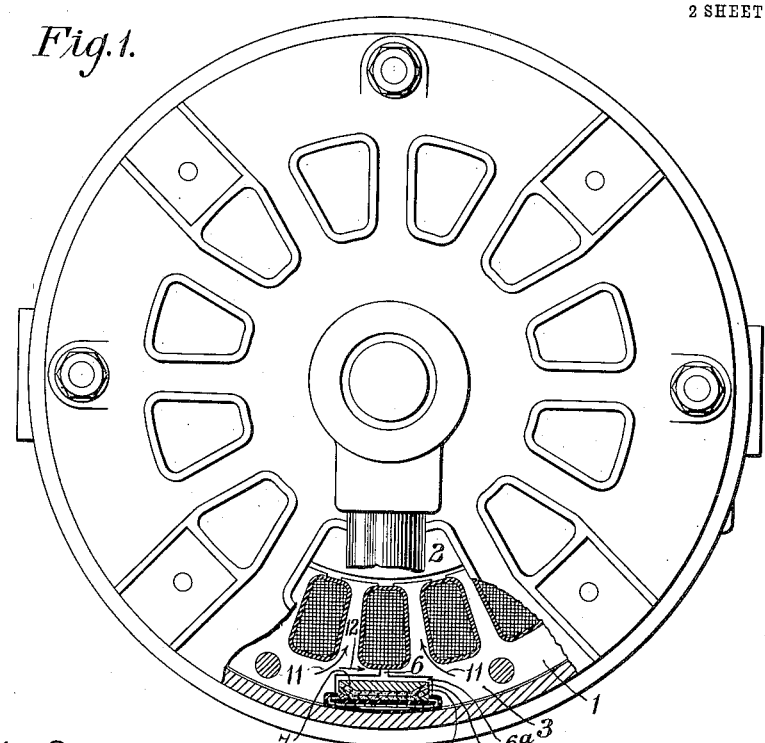
Figure 2:
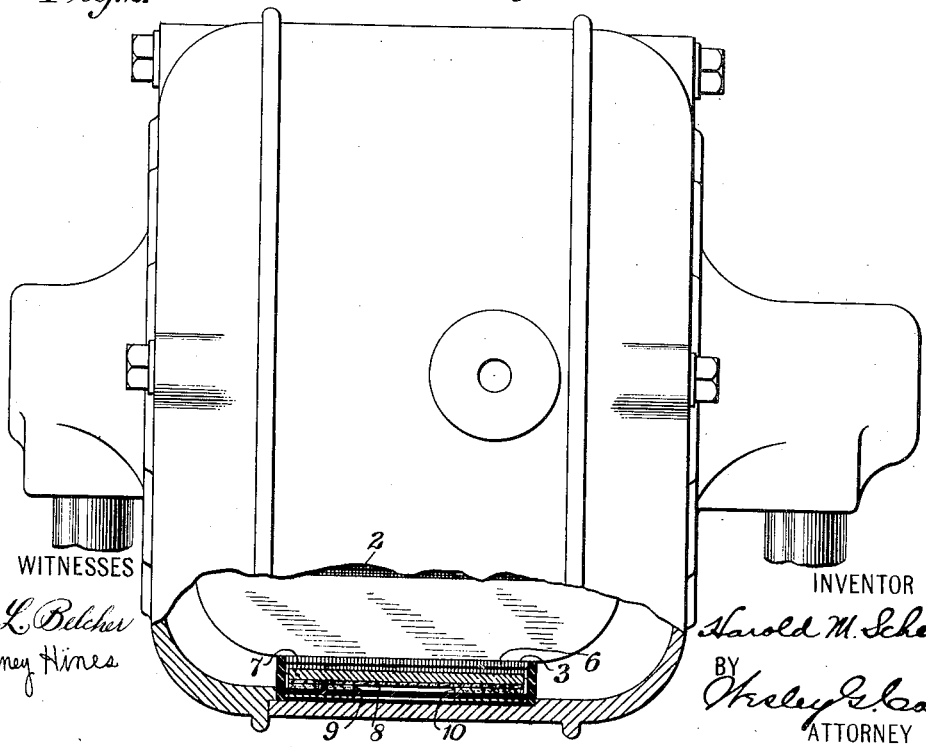
Figure 3:
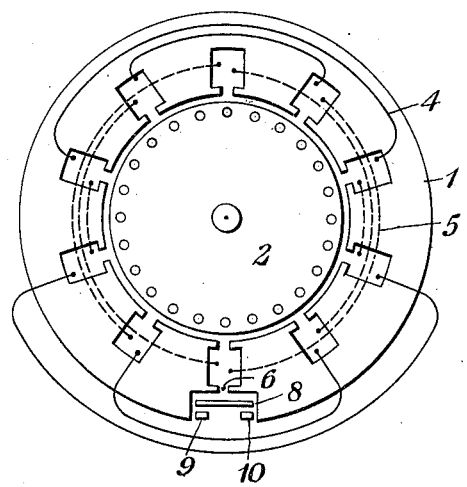

Figure 1 of the accompanying drawing is a view, in end elevation, of a motor that embodies my invention, a portion of the casing being broken away for the sake of clearness of illustration. Fig. 2 is a view, in side elevation, of the motor shown in Fig. 1, a portion of the casing being broken away. Fig. 3 is a simplified diagrammatic view of the magnetizable core member and the winding of the motor, and Fig. 4 is a diagrammatic view of the winding in development.

Figure 4:
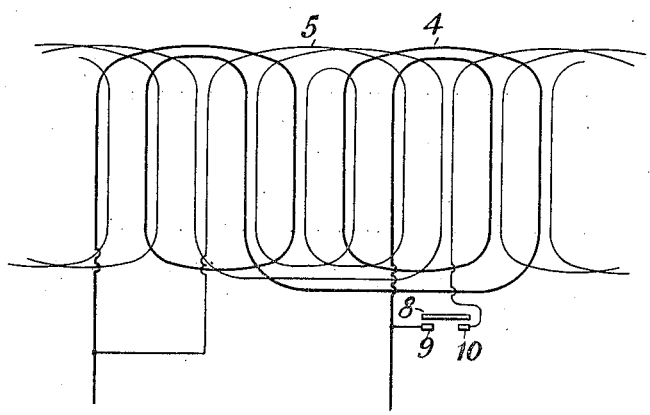

The motor comprises a stationary primary member 1, and a rotatable secondary member 2, the former of which is provided with a magnetizable core 3 having slots in its inner periphery for the reception of a main exciting winding 4 and a relatively high-resistance auxiliary or starting winding 5, the said windings being so disposed in the slots as to produce poles approximately 90 electrical degrees apart, substantially as indicated in Figs. 3 and 4. The magnetizable core is provided with a radial slit or opening 6 in approximately the central or neutral plane of one of the magnetic poles produced by the main winding 4, that communicates, at its inner end, with a slot containing conductors of the auxiliary starting winding and, at its outer end, with a longitudinal recess 6ᵃ provided in the outer peripheral surface of the magnetizable core. The object of the slit or opening 6 is to provide a path of high reluctance across one of the poles produced in the core by the main winding, and for that reason, other means, such as a restriction of the core at 6, may be employed, if desired, for effecting this result. Located within the recess 6ᵃ and arranged to span the opening 6 is an armature 7 that carries a conducting strip 8, the said armature normally occupying the position shown to permit the strip 8 to engage and connect two terminal blocks 9 and 10, one of which is connected to a terminal of the auxiliary starting winding 5 and the other of which is connected to one of the motor terminals, as indicated in Fig. 4.

When current is first supplied to the motor, the greater portion of it traverses the main winding 4 and a small portion traverses the auxiliary winding 5 by way of the switch comprising parts 8, 9 and 10. The flux produced by the main winding in the portions of the magnetizable core 1 adjacent to the slit or opening at 6 is directed as indicated by the arrows 11, there being no tendency for the said flux to traverse the opening 6, since the latter is disposed in a neutral plane of a pole produced by the main winding. However, as the speed of the motor increases, a flux, that increases in value with the speed, is produced in the primary core 3, in a direction indicated by arrows 12, by the reaction of the secondary member of the motor, the said flux crossing the slit or opening 6 and thereby causing a difference of magnetic potential between the portions of the core adjacent to the said opening.

At the lower speeds, the cross magnetizing flux, as the flux caused by the secondary reaction is usually termed, is insufficient to raise the armature 7, but when the motor has attained a predetermined speed the said flux becomes of such a value as to cause the armature to be raised and the member 8 to disengage the terminal blocks 9 and 10. The circuit of the starting winding is then interrupted and the motor is thereafter caused to operate by the main winding alone.

I claim as my invention:

1. In an electric motor, the combination with primary and secondary members, and an auxiliary starting winding, of a circuit making and breaking device for said starting winding, the operation of which is dependent upon the cross magnetizing flux in the primary member.

2. In an electric motor, the combination with primary and secondary members, and an auxiliary starting winding, of a circuit opening and closing device for said starting winding which is electro-magnetically actuated to open the circuit by the magnetic reaction of the secondary member upon the primary member.

3. In an electric motor, the combination with primary and secondary members, and an auxiliary starting means, of a governing device for the starting means, the operation of which is dependent upon the cross magnetizing flux in the primary member.

4. In an electric motor, the combination with primary and secondary members, and an auxiliary starting means, of a governing device for the starting means, the operation of which is dependent upon the cross magnetizing flux in the primary member, the said starting means being rendered ineffective when the cross magnetizing flux attains a predetermined value.

5. In an electric motor, the combination with a magnetizable core, and main and auxiliary exciting windings therefor, of a normally closed switch in the circuit of the auxiliary winding, the operation of which is dependent upon the cross magnetizing flux in the said core.

6. In an electric motor, the combination with a magnetizable core, and main and auxiliary exciting windings therefor, of means dependent in operation upon the cross magnetizing flux in said core for interrupting the circuit of the auxiliary winding when the cross magnetizing flux exceeds a predetermined value.

7. In an electric motor, the combination with a magnetizable core, and main and auxiliary exciting windings therefor, the said core having a slit or opening at approximately the center of one of the poles produced therein by the main winding, of a switch in the circuit of the auxiliary winding, and an actuating armature therefor that spans the slit in the magnetizable core.

8. In an electric motor, the combination with a magnetizable core, and main and auxiliary exciting windings therefor, the said core having a slit through one of the poles produced therein by the main winding, of a switch in circuit with the auxiliary winding, and an actuating armature therefor that spans the slit in the magnetizable core.

9. In an electric motor, the combination with a magnetizable core, and main and auxiliary exciting windings therefor, the said core being provided with a high reluctance path across one of the poles produced therein by the main winding, of an armature that spans the high reluctance portion of the core, and means operated thereby for governing the circuit of the auxiliary winding.

In testimony whereof, I have hereunto subscribed my name this 28th day of August, 1907.

HAROLD M. SCHEIBE.

Witnesses:
W. J. BRANSON,
BIRNEY HINES.